United States Patent [19]
Sensui

[11] Patent Number: 5,530,236
[45] Date of Patent: Jun. 25, 1996

[54] FOCUS DETECTING APPARATUS WITH PARTICULAR ARRANGEMENT OF LIGHT RECEIVING PORTIONS

[75] Inventor: Takayuki Sensui, Tokyo, Japan

[73] Assignee: Asahi Kogaku Kogyo Kabushiki Kaisha, Tokyo, Japan

[21] Appl. No.: 272,050

[22] Filed: Jul. 8, 1994

[30] Foreign Application Priority Data

Jul. 8, 1993 [JP] Japan .................................. 5-169082

[51] Int. Cl.$^6$ ...................................................... G01J 1/20
[52] U.S. Cl. ........................................ 250/201.8; 354/407
[58] Field of Search ........................... 250/201.8, 201.2, 250/201.4, 201.5; 354/402–408; 356/125, 1, 4

[56] References Cited

U.S. PATENT DOCUMENTS

| | | | |
|---|---|---|---|
| 4,636,627 | 1/1987 | Matsumura | 250/201.8 |
| 4,954,701 | 9/1990 | Suzuki et al. | 250/201.8 |
| 4,988,856 | 1/1991 | Hamada et al. | 250/201.8 |
| 4,992,818 | 2/1991 | Karasaki et al. | 354/407 |
| 5,017,005 | 5/1991 | Shindo | 356/125 |
| 5,140,359 | 8/1992 | Higashihara et al. | 354/402 |
| 5,155,518 | 10/1992 | Utagawa | 354/407 |
| 5,192,860 | 3/1993 | Shinohara et al. | 250/201.8 |
| 5,206,498 | 4/1993 | Sensui | 250/201.8 |
| 5,241,168 | 8/1993 | Sensui | 250/201.8 |
| 5,257,062 | 10/1993 | Moriyama | 250/201.8 |
| 5,321,248 | 6/1994 | Sensui | 250/201.8 |
| 5,327,192 | 7/1994 | Sensui | 354/408 |
| 5,393,969 | 2/1995 | Ohsawa | 250/201.8 |

FOREIGN PATENT DOCUMENTS

| | | |
|---|---|---|
| 0479550 | 4/1992 | European Pat. Off. . |
| 1155308 | 6/1989 | Japan . |
| 2-58012 | 2/1990 | Japan . |
| 2255869 | 11/1992 | United Kingdom . |

OTHER PUBLICATIONS

English Language Abstract of JP-5-66345.

*Primary Examiner*—Edward P. Westin
*Assistant Examiner*—Que T. Le
*Attorney, Agent, or Firm*—Greenblum & Bernstein

[57] ABSTRACT

A focus detecting apparatus includes a field mask disposed on a focal plane, the field mask being provided with multiple apertures arranged in a first configuration. A plurality of condenser lenses is disposed behind the apertures, each of the condenser lenses corresponding to each of the apertures. The apparatus further includes plural pairs of separator lenses for splitting images seen through the apertures. A sensor unit having multiple line sensors is arranged in a second configuration that differs from the first orientation configuration: The multiple line sensors are disposed on a reimaging plane for reimaging the split images, and each of the line sensors corresponds to each of the multiple apertures. The apparatus also includes a mechanism for deflecting a bundle of rays, passing through at least one of the multiple apertures, to be close to another bundle of rays passing through another aperture while the first configuration is maintained. A mechanism for changing the orientation of the bundles of rays of the first configuration passed through the multiple apertures into the second configuration, is provided and is disposed between the deflecting mechanism and the separator lenses.

18 Claims, 12 Drawing Sheets

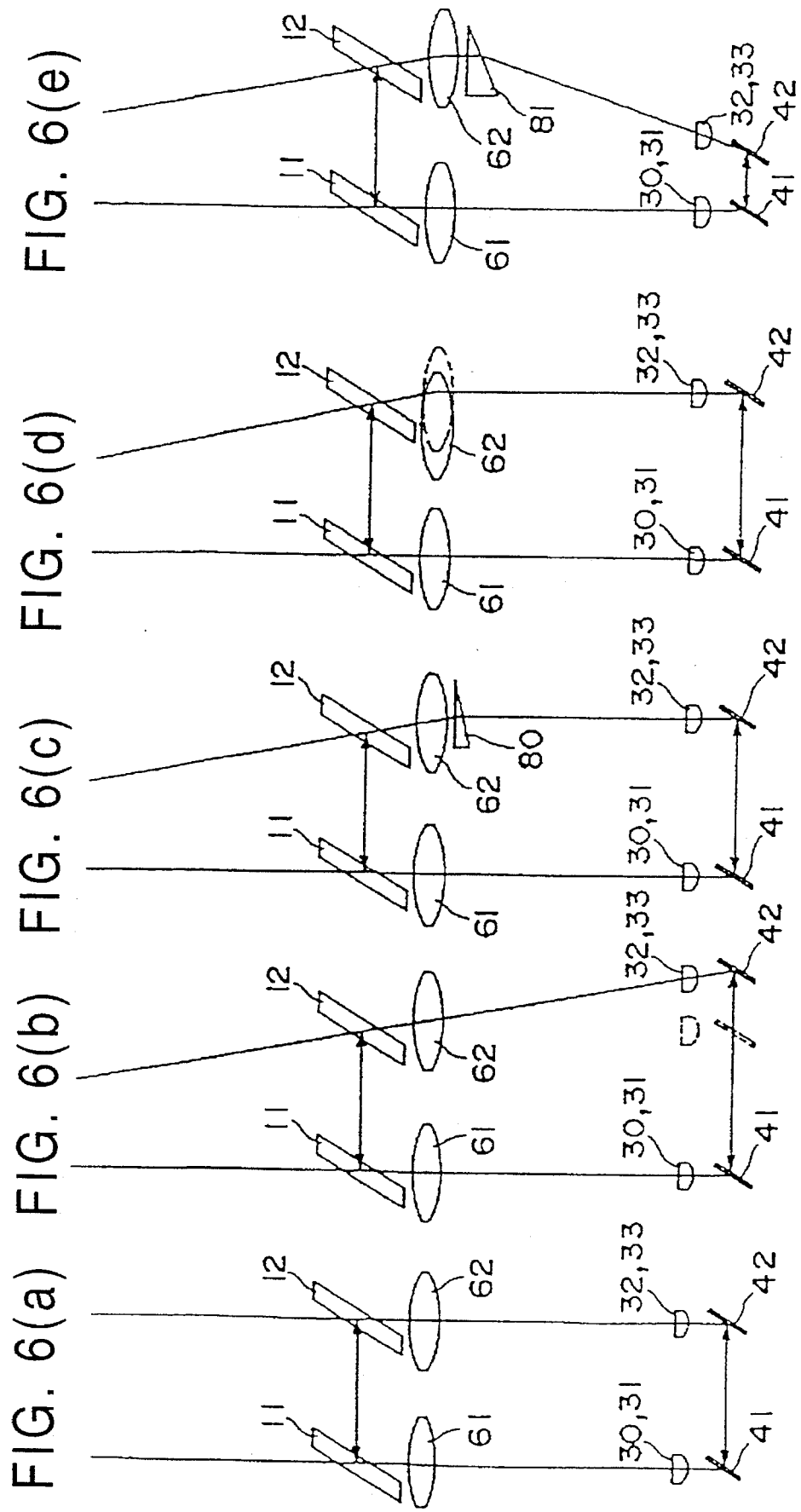

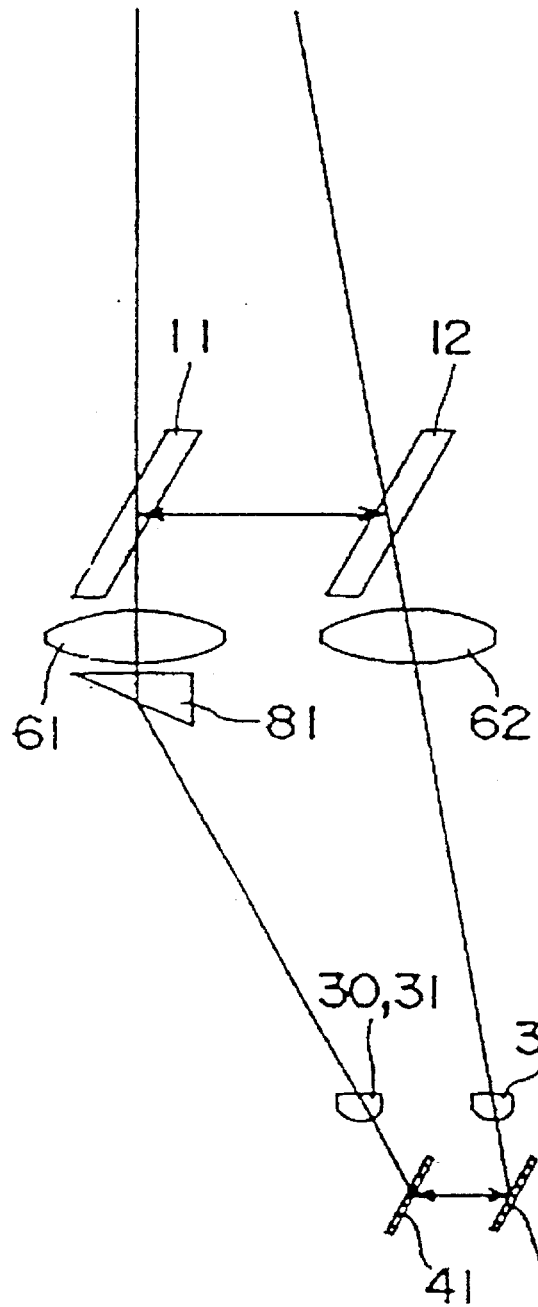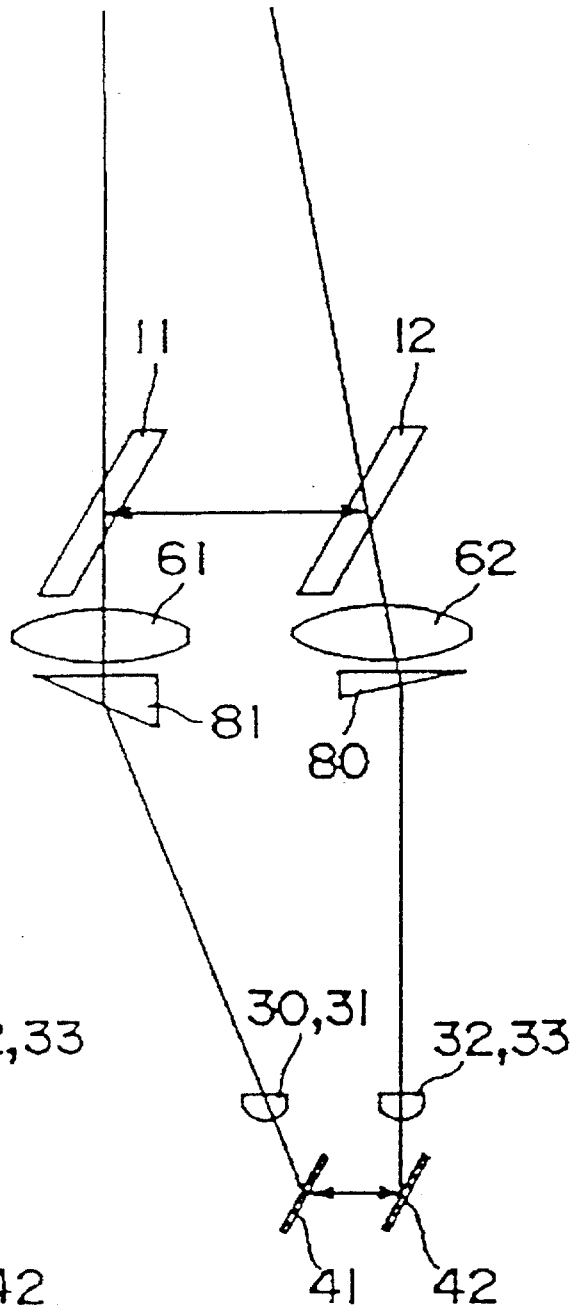

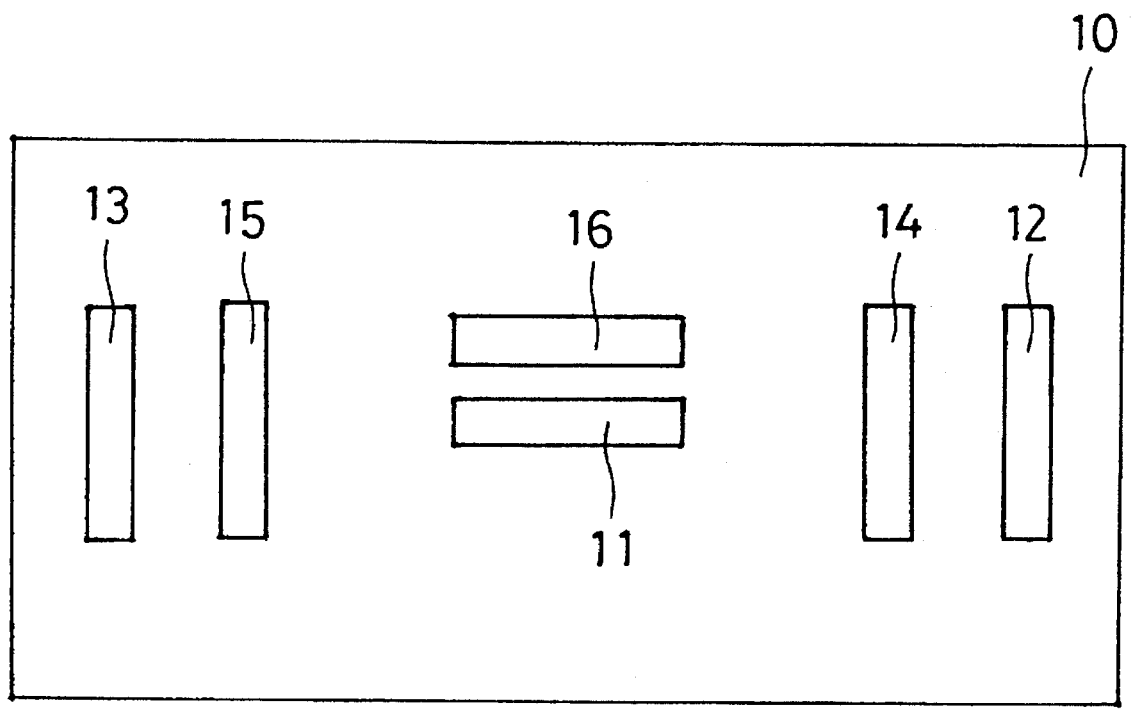

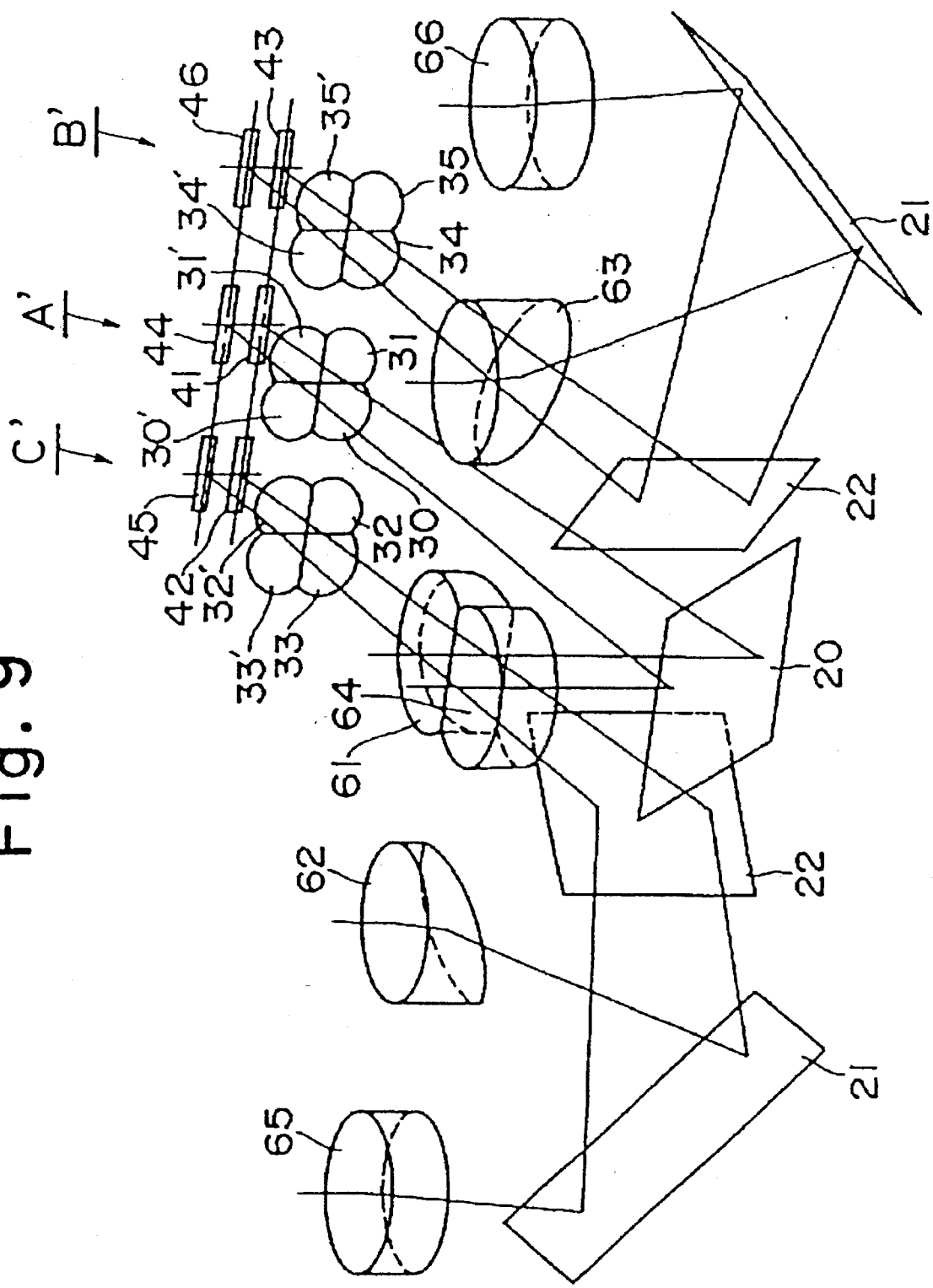

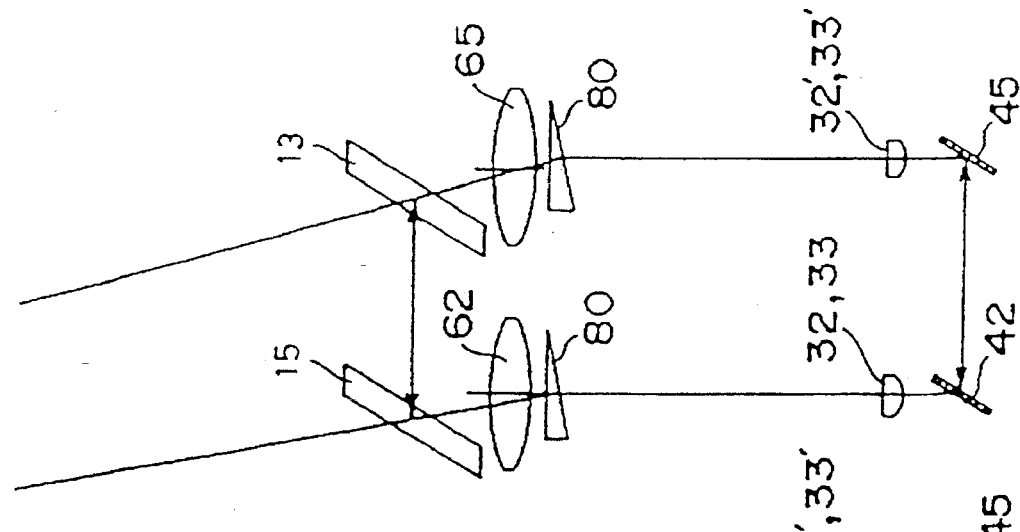
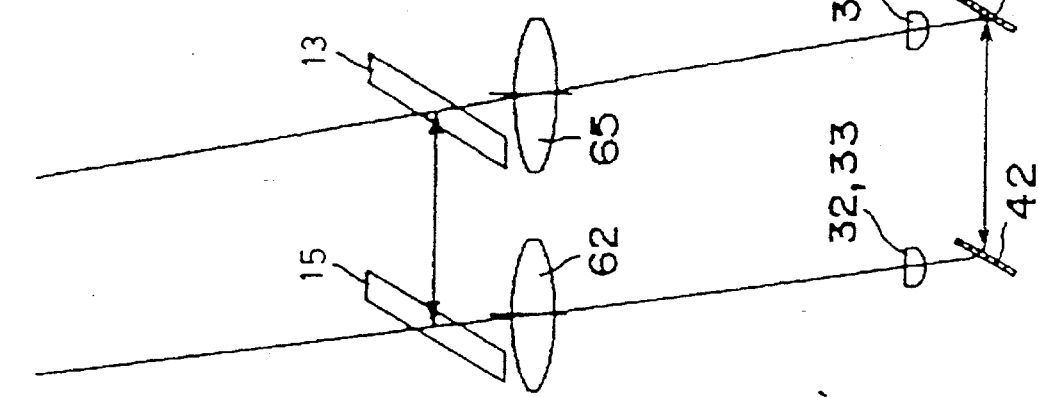
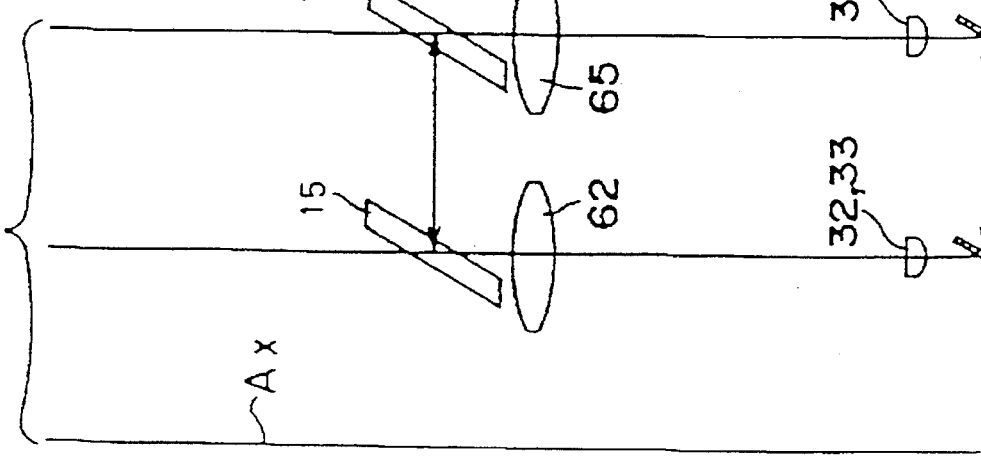

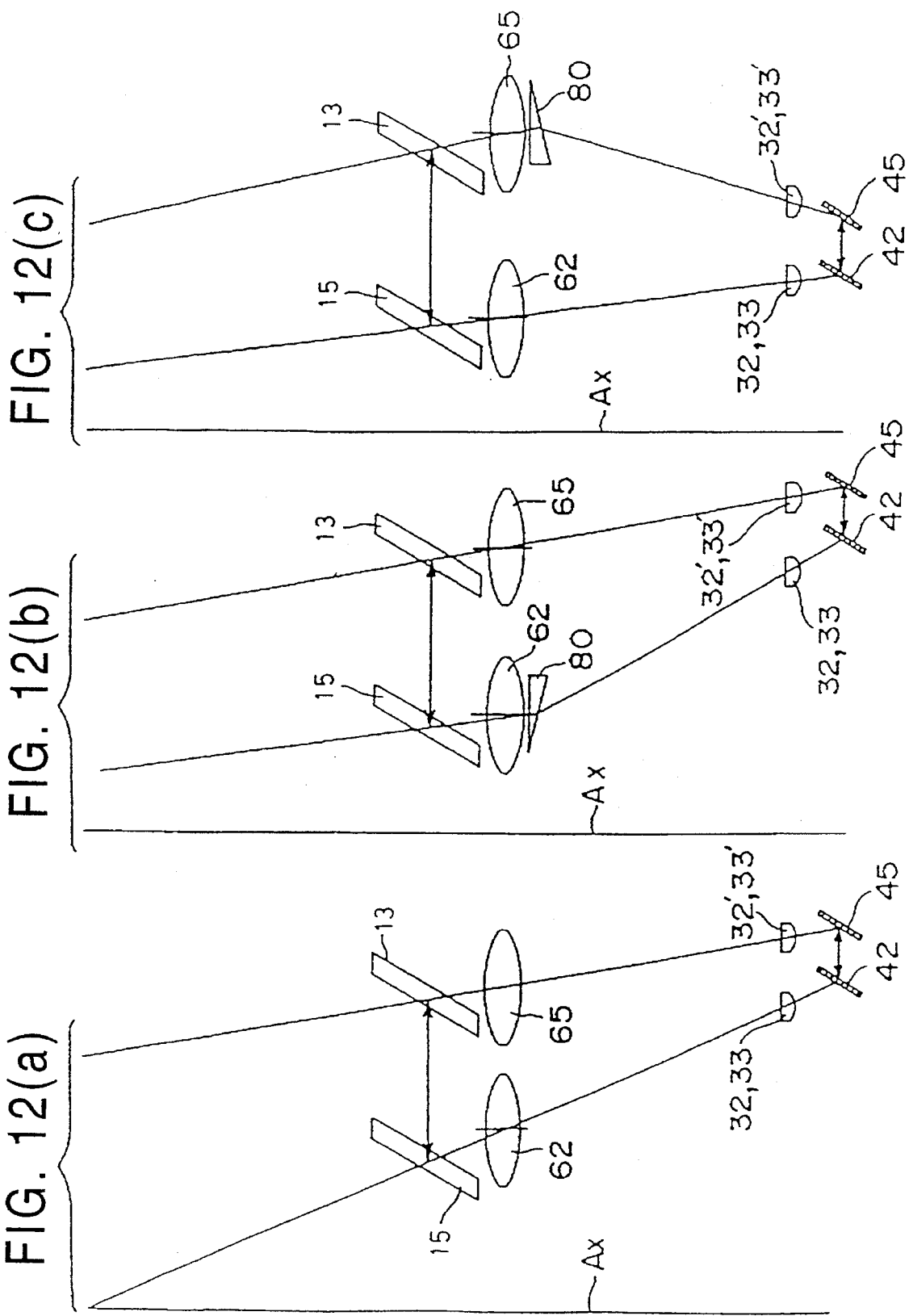

FOCUS DETECTING APPARATUS WITH PARTICULAR ARRANGEMENT OF LIGHT RECEIVING PORTIONS

This application is related to application Ser. No. 085,137, filed on Jul. 2, 1993, now U.S. Pat. No. 5,321,248, and continuation application Ser. No. 187,066, filed in Jan. 27, 1994, now U.S. Pat. No. 5,397,887, and based upon application Ser. No. 085,137, the disclosures of which are expressly incorporated herein in their entirety.

BACKGROUND OF THE INVENTION

1. Field of the Invention

The present invention relates to a focus detecting apparatus, which attains an improved arrangement of light receiving portions (CCD line-sensors: AF sensors) on a reimaging plane and openings formed on a field mask, which is disposed in front of a reimaging optical system to eliminate unnecessary light. Thus, the openings, hereinafter designated as apertures, are accordingly formed as an area through which only necessary bundles of rays for reimaging are passed to be incident on the light receiving portions.

2. Description of Related Art

A focus detecting apparatus, which is related to the present invention, has been disclosed in the Japanese Laid-Open Patent Publications No. 01-155308 and No. 02-58012. The focus detecting apparatus in these publications works in the following manner: an image seen through an aperture on a field mask is separated by a pair of separator lenses and reimaged on AF sensors so that a focus state is judged by the phase difference of the output of the AF sensors.

On the other hand, the focus detecting apparatus mentioned above has some drawbacks regarding the arrangement of the apertures and the AF sensors. The arrangement of the AF sensors has been the same as that of the apertures on the field mask. For example, if the apertures are arranged in "H" shape on the field mask, the AF sensors are arranged in "H" shape on the reimaging plane. Each arrangement of the apertures and the AF sensors may not cause any functional problems. It should, however, be noted that preferable conditions required for the apertures on the field mask and for the AF sensors are inherently different.

For the apertures, in particular, those formed away from an optical axis of a photographing lens, to minimize an adverse effect of vignetting, it is more preferable for them to be formed in the sagittal direction of the photographing lens, i.e., a longer side of the aperture is placed along a shorter side of a film plane, rather than along a longer side of the film plane.

On the other hand, for the AF sensors serving as the light receiving portions, it is preferable that the AF sensors are disposed, without regard to the arrangement of the apertures, in a manner that an area occupied by the AF sensors is as small as possible for the purpose of space saving in a camera.

If the AF sensors are aligned in a single straight line with a space of minimum necessity, the size of a module in which a reimage forming optical system is contained can be much smaller.

Still further, as position and diameter of an exit pupil of a photographing lens vary due to zooming or due to a type of lens being attached to a camera, a pupil of the focus detecting system may suffer a vignetting; thus, it is preferable that an aperture formed on a peripheral part of the field mask receives a bundle of rays from an area of the exit pupil of the photographing lens closer to the optical axis of the lens.

SUMMARY OF THE INVENTION

The primary object of the present invention is to provide a focus detecting apparatus in which bundles of rays can be incident on the light receiving portions (AF sensors) in a manner that at least one bundle of ray is made closer to another bundle of rays. In the light receiving portions, segments (of the light receiving portions) corresponding to each of the apertures can therefore be set closely, which contributes to making the total width of the light receiving portions shorter, and enabling the focus detecting apparatus to be downsized.

Moreover, the present invention is to provide a focus detecting apparatus which enables the apertures on the field mask to receive a bundle of rays from an area of the exit pupil of the photographing lens closer to the optical axis of the lens.

In order to accomplish the above object in a practice, the focus detecting apparatus includes a field mask disposed on an equivalent focal plane, the field mask being provided with multiple apertures arranged in a first orientation configuration; a plurality of condenser lenses disposed behind the apertures, each of the condenser lenses corresponding to each of the apertures; and plural pairs of separater lenses for splitting images seen through the apertures. The focus detecting apparatus also includes a sensor unit having multiple line sensors arranged in a second orientation configuration that differs from the first orientation configuration, the multiple line sensors being disposed on a reimaging plane for reimaging the split images, and each of the multiple line sensors corresponding to each of the multiple apertures. Further, the focusing detecting apparatus is provided with a mechanism for deflecting a bundle of rays passing through at least one of the multiple apertures to be close to another bundle of rays passing through another aperture while the first orientation configuration is maintained. Still further, a mechanism for changing orientation of the bundles of rays of the first orientation configuration passing through the multiple detecting zones into the second orientation configuration is provided the changing mechanism is disposed between the deflecting mechanism the separater lenses.

The present invention relates to the subject matter contained in the Japanese Patent Application No. 5-169082 (filed on Jul. 8, 1993) which is expressly incorporated by reference in their entirety.

BRIEF DESCRIPTION OF THE DRAWINGS

The invention will be described below in detail with reference to the accompanying drawings, in which;

FIG. 6(a) is the original arrangement of the apertures, condenser lenses, separeter lenses, and the light receiving portions (AF sensors) without considering the deflecting means;

FIG. 6(b) is an example wherein the distance between the light receiving portions is made longer to receive a bundle of rays, passed through the aperture formed in the sagital direction of the photographing from an area, of the exit pupil of the photographing lens, closer to the optical axis of the photographing lens;

FIG. 6(c) is an example of the deflecting means (prism) by which the bundle of ray receive the aperture formed in the sagittal direction of the photographing is inclined toward the optical axis of the photographing lens as in FIG. 6(b), and the distance between the light receiving portions are as the same as that of FIG. 6(a);

FIG. 6(d) is another example of the deflecting means (eccentricity of condenser lens) by which a bundle of rays received by an aperture formed in the sagittal direction of the photographing lens is inclined towards the optical axis of the photographing lens as in FIG. 6(b), and the distance between the light receiving portions is as the same as that of FIG. 6(a);

FIG. 6(e) is still another example of the deflecting means (prism) by which the bundle of rays taken by the aperture formed in the sagittal direction of the photographing lens is inclined toward the optical axis of the photographing lens as in FIG. 6(b), and the distance between the light receiving portions is shorter than that of FIG. 6(a);

FIG. 7(a) is an example of the deflecting means (prism) by which the bundle of ray received by the aperture formed in the radial direction of the photographing lens is inclined towards the bundle of rays passed through the aperture formed in the sagittal direction, while the bundle of rays received by the aperture formed in the sagittal direction is inclined toward the optical axis of the photographing lens;

FIG. 7(b) is another example of the deflecting means (prisms) by which the bundle of rays received by the aperture formed in the radial direction of the photographing lens is inclined more toward AF sensors corresponding to the aperture formed in the sagittal direction of the photographing lens, while the bundle of ray received by the aperture formed in the sagittal direction is inclined toward the optical axis of the photographing lens;

FIG. 8 is a front view of the field mask for another type of focus detecting apparatus;

FIG. 9 is a perspective view of the focus detecting apparatus of anther type to which the present invention is applied;

FIG. 11(a) is the original arrangement of the intermediate and the peripheral apertures formed in the sagittal direction, including condenser lenses, separeter lenses, and the light receiving portions (AF sensors) without considering the deflecting means;

FIG. 11(b) is an example of the deflecting means wherein bundles of rays passing through the intermediate and the peripheral apertures are inclined toward the optical axis of the photographing lens by disposing the light receiving portions distant from the optical axis of the photographing lens;

FIG. 11(c) is an example of the deflecting means (prisms) in which the direction of the bundles of rays received by the intermediate and the peripheral apertures formed in the sagittal direction are inclined toward the optical axis of the photographing lens without disposing the light receiving portions far from the optical axis of the photographing lens;

FIG. 12(a) is an example wherein the light receiving portions for the intermediate and the peripheral apertures are closely disposed without considering the deflecting means, and the bundle of rays passed through the intermediate aperture is inclined too much toward the optical axis of the photographing lens;

FIG. 12(b) is another example of the deflecting means (prism) by which the light receiving portions for the intermediate and the peripheral apertures are disposed closely while the direction of the bundles of rays received in the intermediate and the peripheral apertures are maintained as FIG. 11(b) and FIG. 11(c).

FIG. 12(c) is still another example of the deflecting means (prisms) by which the light receiving portions for the intermediate and the peripheral apertures are disposed closely while the direction of the bundles of rays received in the intermediate and the peripheral apertures are maintained as in FIG. 11(b) and FIG. 11(c).

PREFERRED EMBODIMENTS OF THE INVENTION

Figure 1:
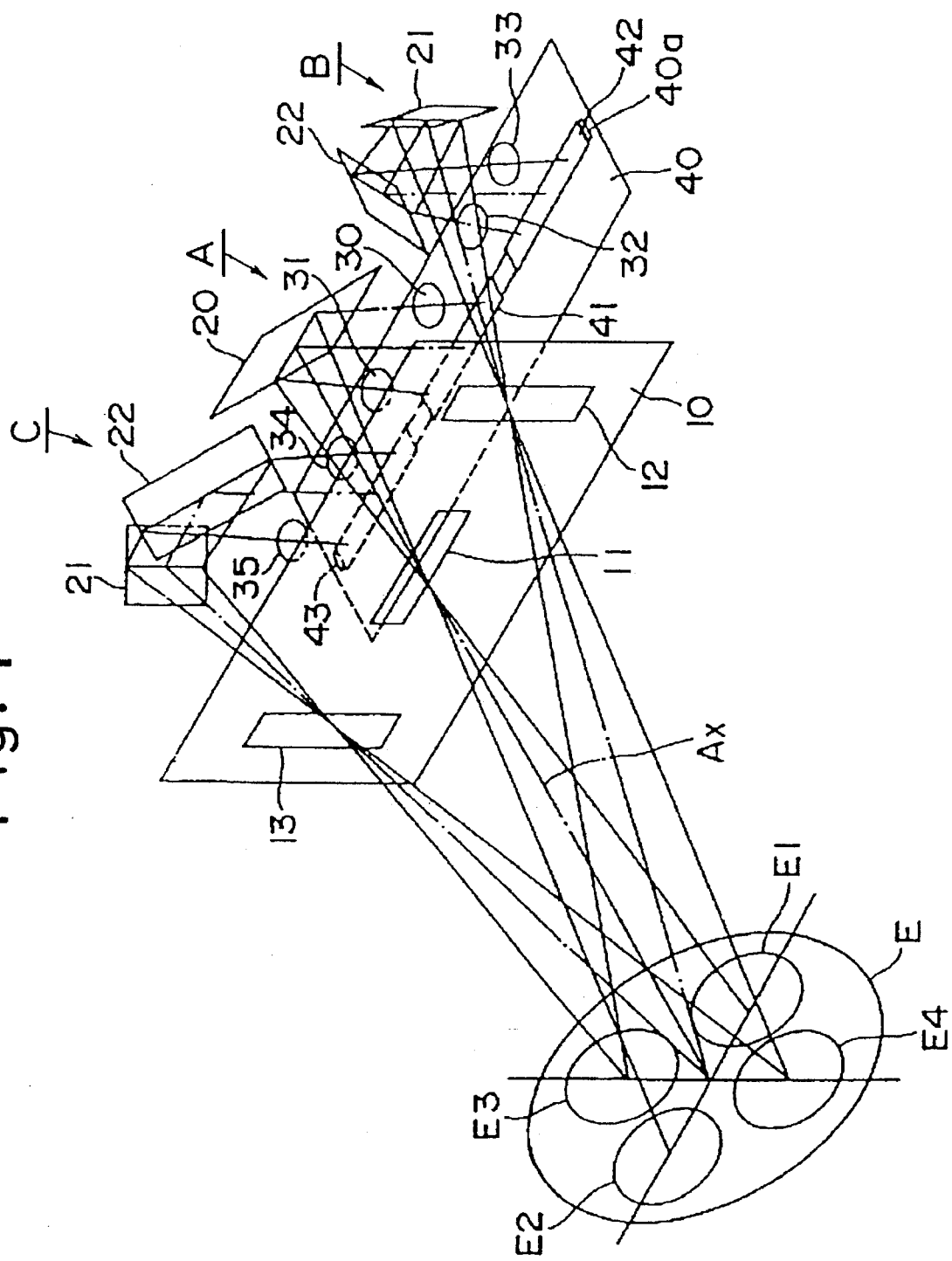
FIG. 1 is a perspective view of the focus detecting apparatus to which the present invention is applied.

A focus detecting apparatus to which the present invention is applied is explained, according to FIG. 1, as a focus detecting apparatus provided in a single lens reflex camera. The focus detecting apparatus in general is disposed in the single lens reflex camera so that a bundle of rays, passing through a photographing lens and a main mirror (a quick return mirror), and reflected by a submirror, is finally made incident on the AF sensors included in a reimaging optical system. Along a path of the bundle of rays in front of the reimaging optical system, a field mask 10 is provided. The field mask 10 is substantially disposed at an equivalent focal plane on which an image of an object is formed by the photographing lens. On the field mask 10, three apertures 11, 12, 13, through which the bundle of rays pass, are formed in a "H" shape. As the apertures are formed for the purpose of eliminating unnecessary light which should not be used for reimaging, an area of the aperture is equal to or slightly larger than that of the light receiving portions of the AF sensors. In the embodiments, this "H" shape arrangement of the apertures is designated as a first orientation configuration.

The equivalent focal plane, on which an image through the photographing lens is formed, is optically conjugate with the film surface for a silver-salt camera, and also conjugate with image sensors for an electronic still camera. Furthermore, for a single lens reflex camera, the equivalent focal plane is optically conjugate with a focusing screen provided in a view finder as well as with the film surface.

The central aperture 11 is formed so that an optical axis of the photographing lens meets the center of figure of the aperture 11. It is defined that the central aperture 11 is disposed along a radial direction of the photographing lens. The apertures 12 and 13 are formed at both sides of the aperture 11. In particular, the longer side of the peripheral apertures are formed to be normal to the longer side of the central aperture 11, i.e., the apertures 12 and 13 are formed in a sagittal direction of the photographing lens. The first orientation configuration, as stated above, is consequently the "H" shape.

In addition to the apertures 11, 12, and 13, the outline of a reimaging system is explained. In FIG. 1, the central aperture 11 corresponds to a reimaging optical system "A" which includes a first mirror 20, a pair of separator lenses 30, 31, and a central light receiving portion 41 of the AF sensors 40a disposed on a reimaging plane 40.

Likewise, the aperture 12, formed in the sagittal direction of the photographing lens, corresponds to a reimaging system "B" which includes a second mirror 21 and a third mirror 22, a pair of separator lenses 32 and 33, and a peripheral light receiving portion 42 of the AF sensor 40a.

The structure of the reimaging optical system "B" is also applied to a reimaging system "C" i.e., the second mirror 21 and the third mirror 22, a pair of separator lenses 34 and 35, and a peripheral light receiving portion 43 of the AF sensor 40a.

A focus detecting apparatus of this type receives a bundle of rays representing an object passing through an exit pupil of the photographing lens into an aperture on a field mask on which an image by the photographing lens is formed. In FIG. 1, four circles E1, E2, E3, and E4 in an exit pupil E of the photographing lens indicate areas on the exit pupil E seen from the light receiving portions 41, 42, and 43 of the AF sensors 40a. The AF sensors are a single CCD sensors, and predetermined segments of the single CCD sensors are used as the light receiving portions 41, 42, and 43. It should be noted that these segments are not actual cut portions of the CCD sensors, but are electrically determined segments used as light receiving portions.

In a more detailed manner, the separator lenses 30 and 31 can respectively see the object to be photographed through the areas of E1 and E2 through the central aperture 11. The bundle of rays from the areas E1 and E2 are deflected 90 degrees (a right angle) by the mirror 20 toward the separater lenses 30 and 31, and then the bundles of rays are separated by the separater lenses 30 and 31. The separated bundle of rays are respectively led to the central light receiving portion 41 of the AF sensors 40a to reimage the object seen through the central aperture 11; therefore pupils of the separator lenses 30 and 31 are optically conjugate with the exit pupil E of the photographing lens.

Similar to the reimaging optical system "A", in the reimaging optical system "B", the separator lens pair 32 and 33 can respectively see the object to be photographed through the areas of E3 and E4 through the aperture 12 formed in the sagittal direction. The bundle of rays from the areas E3 and E4 are deflected 90 degrees (a right angle) by the mirror 21 and deflected 90 degrees (a right angle) by the mirror 22 toward the separator lenses 32 and 33, and then the bundle of rays are separated by the separator lenses 32 and 33. The separated bundle of rays are respectively led to the peripheral light receiving portion 42 of the AF sensors 40a to reimage the object seen through the aperture 12.

Like the reimaging optical system "B", in the reimaging optical system "C", the separator lens pair 34 and 35 can respectively see the object to be photographed through the areas of E3 and E4 through the aperture 13 formed in the sagittal direction. The bundle of rays from the areas E3 and E4 are deflected 90 degrees (a right angle) by the mirror 21 and also deflected 90 degrees (a right angle) by the mirror 22 toward the separator lenses 34 and 35, and then the bundle of rays are separated by the separator lenses 34 and 35. The separated bundle of rays are respectively led to the peripheral light receiving portion 43 of the AF sensors 40a to reimage the object seen through the aperture 13 formed in the sagittal direction.

As shown in FIG. 1, the light receiving portions 41, 42, and 43 of the AF sensors 40a are disposed on the reimaging plane 40 in a "—" shape. This "—" shape is designated as a second orientation configuration, which is different form the "H" shape of the first orientation configuration formed by the apertures 11, 12, and 13.

In a view finder (not shown), there are provided AF focusing zones corresponding to each of the apertures 11, 12, and 13. On the other hand, a focus detecting circuit (not shown) detects a focusing condition by an output of an AF sensor, corresponding to the aperture being used, or by an output of AF sensor corresponding to an aperture, which meets an object selected by a circuit in the camera body.

As explained, the mirrors 20, 21, and 22 allow a different orientation configuration of the AF sensors 40a without following the first orientation configuration of the apertures 11, 12, and 13, because these mirrors deflect the bundle of rays, passed through the apertures 11, 12, and 13 having the first orientation configuration, 90 degrees (a right angle) to the AF sensors 40a with the second orientation configuration. The mirrors 20, 21, and 22 function as an orientation changing means.

Figure 2:
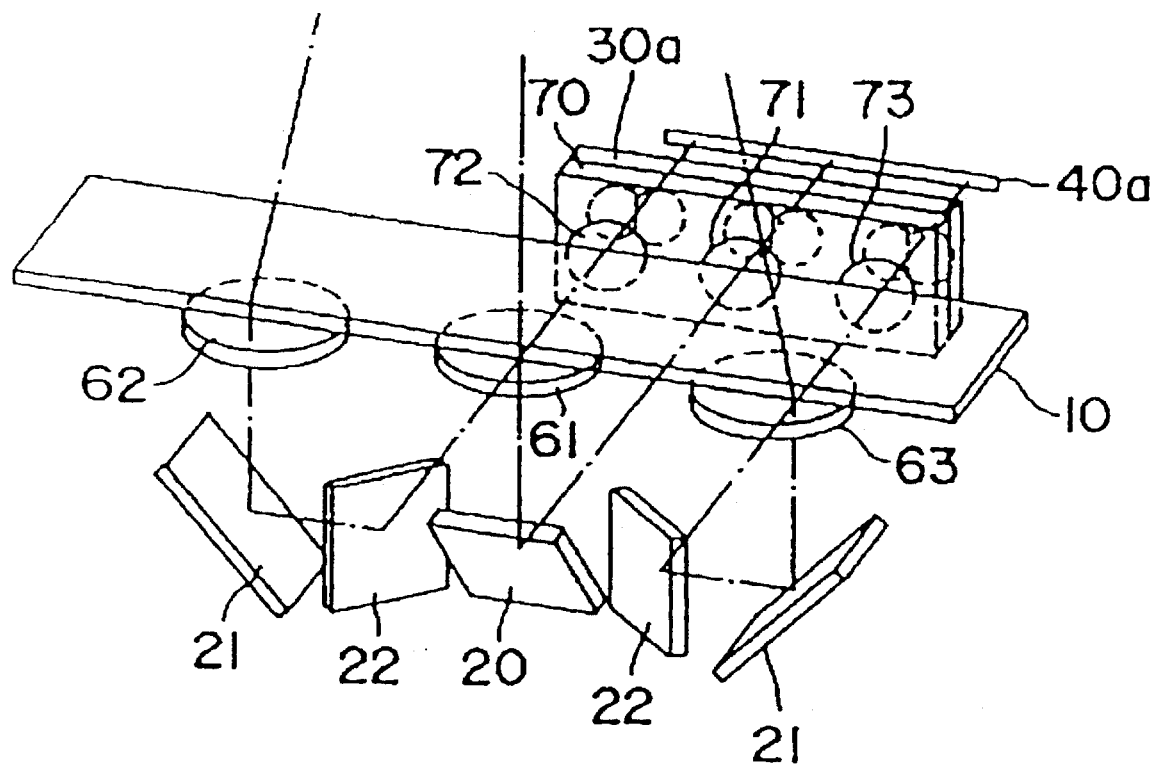
FIG. 2 is a perspective view of the reimage forming optical system contained in one module.
Figure 3:
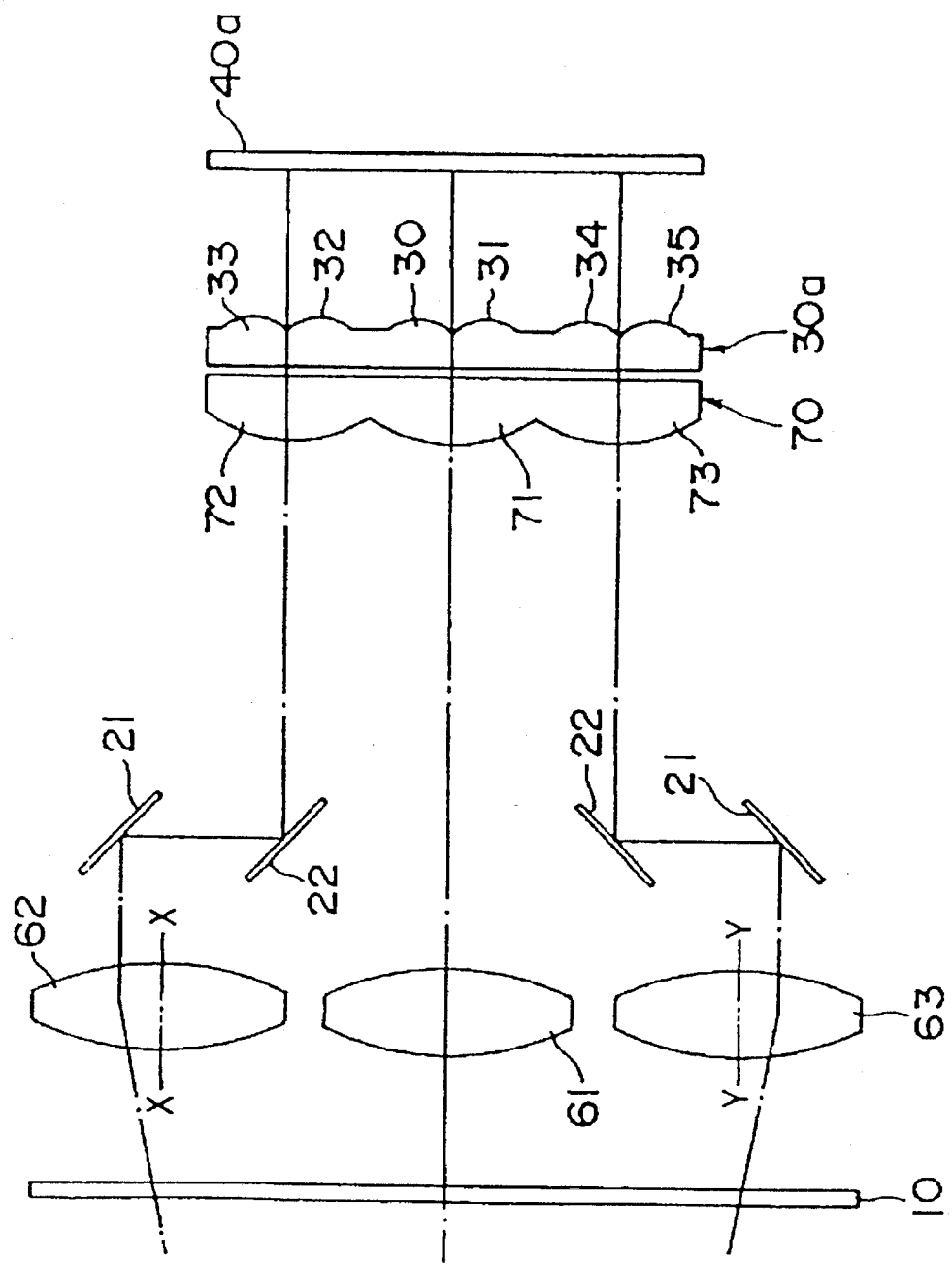
FIG. 3 is a exploded view showing a detail of the reimage forming optical system of FIG. 2.

In FIG. 2 and FIG. 3, structural components of the reimaging optical system are shown. The components shown in FIG. 2 are fabricated in a single module, and placed in the camera. Behind the field mask 10, condenser lenses 61, 62, and 63 functioning as relay lenses are provided to correspond to each of the AF detecting zones 11, 12, and 13. Furthermore, a collection lens group 70 comprising auxiliary lenses 71, 72, and 73, a separator lens group 30a comprising separator lenses 30 through 35, and the CCD line sensors 40a are disposed in this order.

As shown in FIG. 3, an optical axis (shown by a dotted line) of the condenser lens 61, corresponding to the central aperture 11, is aligned to a central axis of the separator lenses 30 and 31 and an optical axis of the auxiliary lens 71. On the other hand, optical axes "x—x" and "y—y" of the condenser lenses 62 and 63, corresponding to the apertures 12 and 13 respectively are deviated toward the condenser lens 61 to deflect the bundles of rays passed through the condenser lenses 62 and 63 toward the condenser lens 61. In other words, by eccentrically disposing the condenser lenses 62 and 63 from the optical axes of the condenser lens 62 and 63 toward the optical axis of the condenser lens 61; it is understood that the condenser lenses 62 and 63 function as prisms.

Figure 4:
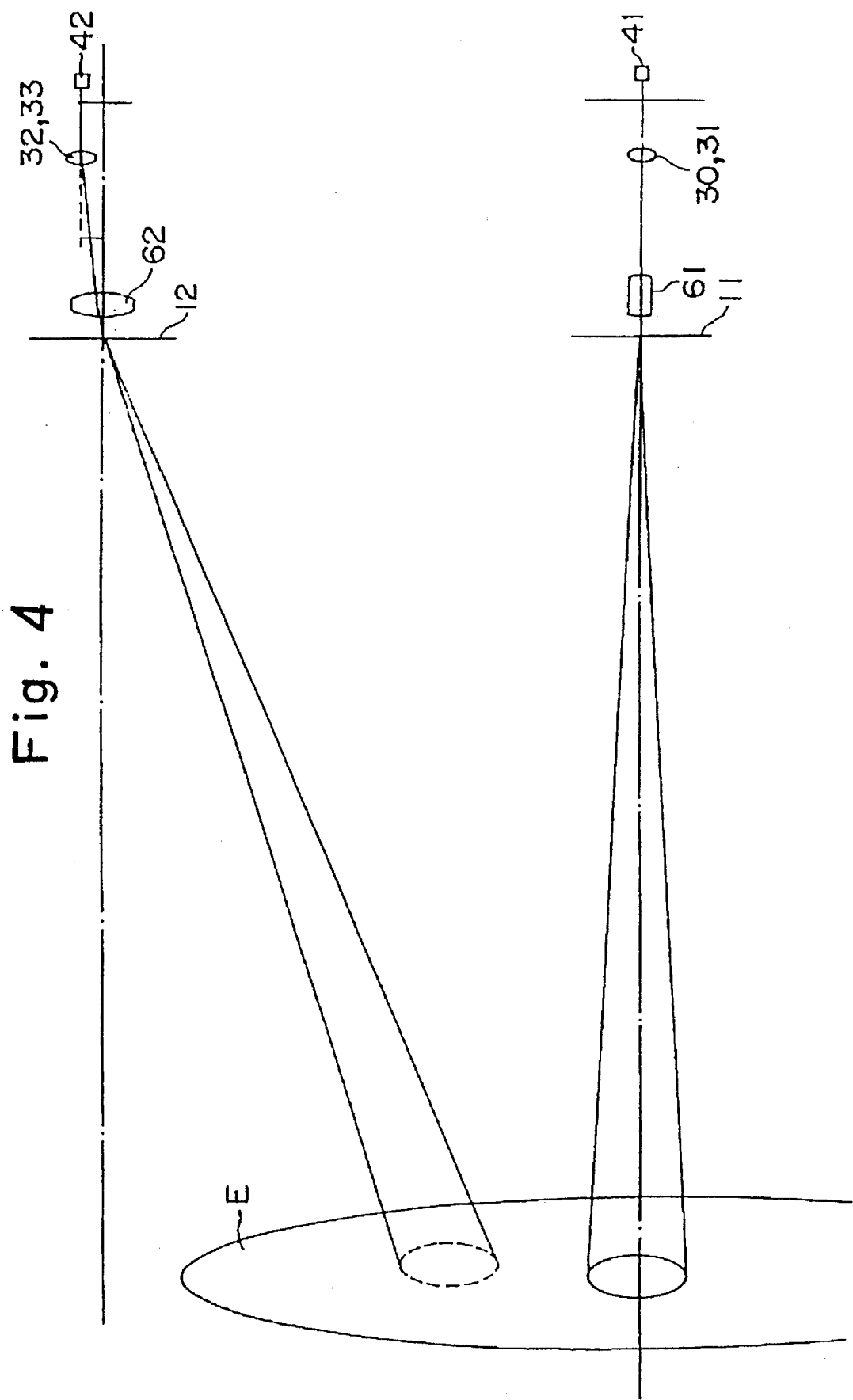
FIG. 4 is a plane view indicating the effect of deflection by the condenser lens of the peripheral AF detecting zone.

Effects of the deviation of the condenser lenses 62 and 63 are shown in FIG. 4. FIG. 4 shows the above mentioned deviation of the condenser lens 62 in relation to the bundle of rays respectively taken in the aperture 12 formed in the sagittal direction of the photographing lens and the aperture 11 formed in the radial direction of the photographing lens. It can be understood from FIG. 4 that by eccentrically disposing the condenser lenses 62 and 63, the bundles of rays passed through the apertures 12 and 13 are made to be close to the bundle of ray passed through the aperture 11. In other words, the eccentricity of the condenser lenses 62 and 63 constitutes a deflecting means to deflect at least one bundle of ray heading for the reimaging plane, toward the bundle of ray passed through the condenser lens and, also heading for the reimaging plane.

It should be noted that the deflecting means can therefore attain a preferable arrangement of the light receiving portions 41, 42, and 43 of the AF sensors 40a, because the light receiving portions 41, 42, and 43 of the AF sensors 40a on the reimaging plane 40 can be disposed as close as possible within a range where no interference of light occurs, so that the total length of the second orientation configuration can actually be shortened. In particular, when the AF sensors 40a comprises the single CCD sensors, in accordance with the above-described functioning of the deflecting mechanism, a distance between the segments (electrically determined and used as the light receiving portions) can be shortened. Moreover, when the minimum distance without any interference of light is known, the total length of the single CCD line sensors can be minimized for the purpose of saving space.

The deflecting mechanism as it relates the present invention, is explained according to FIG. 5(a) through FIG. 5(d), FIG. 6(a) through FIG. 6(e), and FIG. 7(a) and FIG. 7(b). For better understanding of the deflecting mechanism, the drawings show only the two apertures 11 and 12, and the corresponding light receiving portions 41 and 42 of AF sensors 42a in exploded views. Moreover, in these figures, the function of the orientation changing mechanism, i.e. mirror 20, 21, and 22, is disregarded. A series of measures applied to the aperture 12 is also applicable to the aperture 13. Effects of the above measures for the aperture 12 are also obtainable for the aperture 13.

Figure 5A:
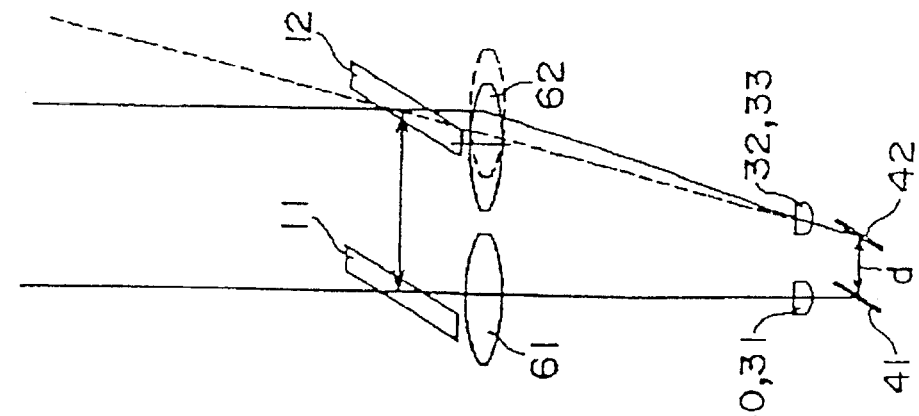
FIG. 5(a) is the original arrangement of the apertures, condenser lenses, separator lenses, and the light receiving portions (AF sensors) without considering the deflecting means.

Suppose an arrangement of the apertures 11 and 12, the condenser lenses 61 and 62, the separater lenses 30, 31, 32, and 33, and the light receiving portions 41 and 42 of the AF sensors 42a, shown in FIG. 5(a), is the original arrangement in which no consideration is given to the location of the light receiving portions 41 and 42 of the AF sensors 42a. In other words, the light receiving portions 41 and 42 are disposed with a distance "d", which simply follows the distance between the positions of the apertures 11 and 12.

Figure 5B:
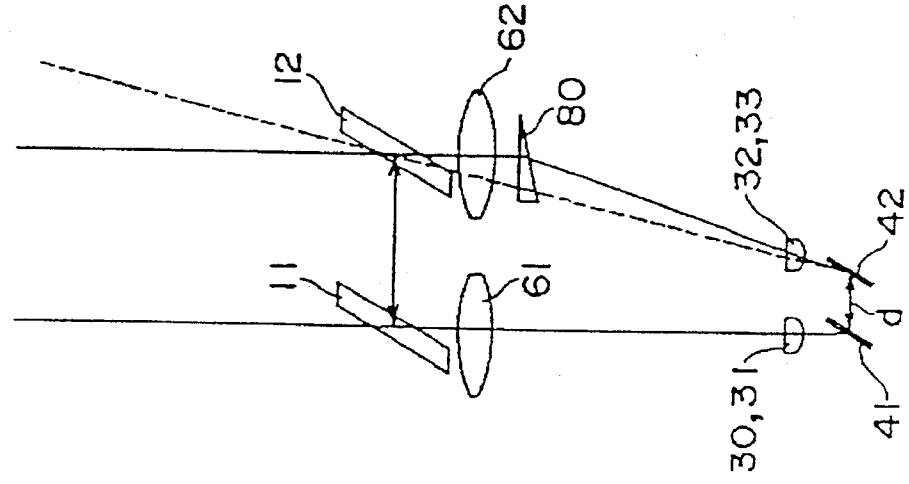
FIG. 5(b) is an example wherein the distance between the light receiving portions is made shorter, and no deflecting means is considered.

With the arrangement of FIG. 5(a), if only the distance "d" is shortened, as shown in FIG. 5(b), the direction of the bundle of rays taken in the aperture 12 is largely deviated from the original course of FIG. 5(a), so that either one or both light receiving portions 41 and 42 of the AF sensors may suffer a vignetting. Enough light may consequently not be led to the light receiving portions 41 and 42. To compensate for the above drawback in FIG. 5(b), a prism 80 is disposed between the condenser 62 and the separater lenses 32 and 33 as shown in FIG. 5(c), so that the direction of the bundle of ray taken in the aperture 12 can be maintained as that of FIG. 5(a) while the distance "d" is made shorter than that of FIG. 5(a).

Figure 5C:
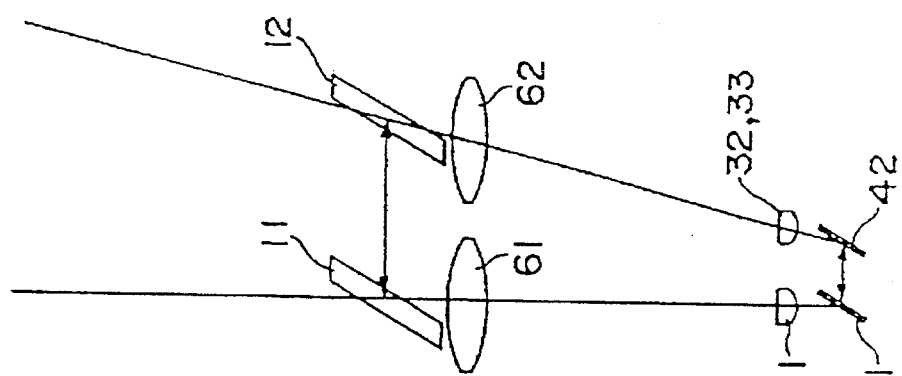
FIG. 5(c) is an example of the deflecting means (prism) by which a direction of a bundle of rays passed through the aperture formed in a sagittal direction of the photographing lens is the same as that of FIG. 5(a)
Figure 5D:
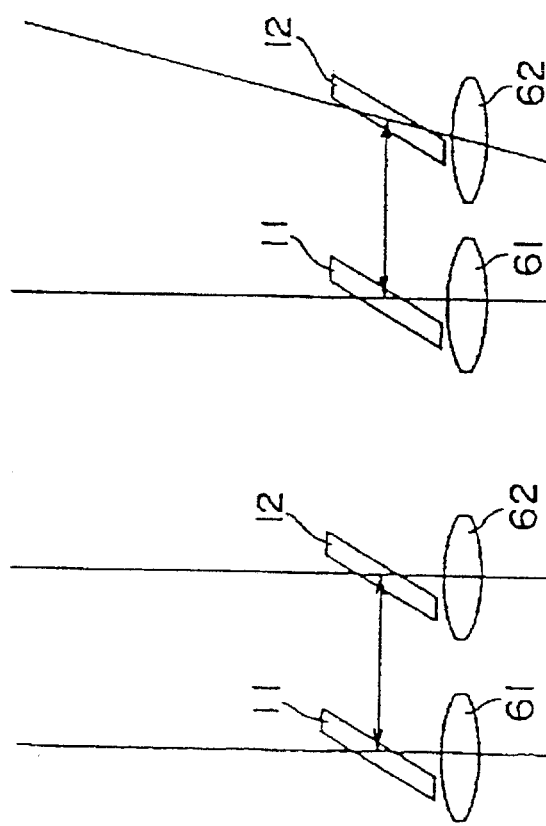
FIG. 5(d) is another example of the deflecting means (eccentricity of condenser lens) by which a direction of a bundle of rays passed through the aperture formed in the sagittal direction of the photographing is the same as that of FIG. 5(a)

The same effect of FIG. 5(c) can be obtained by utilizing an eccentricity of the condenser lens 62. In other words, as shown in FIG. 5(d), the condenser lens 62 is deviated toward the condenser lens 61. It is understood that the condenser lens 62 in FIG. 5(d) functions as a prism.

As explained, the prism 80 and the eccentricity of the condenser lens 62 function as the deflecting mechanism having a feature that the direction of the bundles of rays to the condenser lenses 61 and 62 is not changed while the light receiving portions 41 and 42 of the AF sensors are disposed closer.

The above examples of FIG. 5(a) through FIG. 5(d) mainly deal with the arrangement of the light receiving portions of the AF sensors. Meanwhile, when an image is formed through the apertures 12 and 13 formed in the sagittal direction of the photographing lens, it is preferable that the aperture 12, for example, receives in a bundle of rays from an area of the exit pupil E as close as possible to the optical axis of the photographing lens, because a bundle of rays taken from the peripheral part of the photographing lens may cause vignetting if the size of the exit pupil of the photographing lens is small, and/or when the exit pupil of the photographing lens moves in the optical axis direction. It is therefore preferable that the direction of the bundle of rays be made to incline toward the optical axis of the photographing lens.

Examples, which take the above consideration into account, are shown in FIG. 6(a) through FIG. 6(e). Similar to FIG. 5(a), the original arrangement of the apertures 11 and 12, the condenser lenses 61 and 62, the separator lenses 30, 31, 32, and 33 is shown in FIG. 6(a).

If the distance "d" of the light receiving portions 41 and 42 of the AF sensors is made longer, as shown in FIG. 6(b), to enable the peripheral AF detecting zone 12 to receive a bundle of ray from an area on the exit pupil E of the photographing lens close to the optical axis of the photographing lens, a space for containing the light receiving portions 41 and 42 of the AF sensors is large, which means that the size of the module is inevitably large.

To compensate for the above drawback, the prism 80, as shown in FIG. 6(c), is disposed between the condenser lens 62 and the separater lenses 32 and 33. It is clearly shown in FIG. 6(c) that the distance "d" is maintained as the same as that of FIG. 6(a) while the bundle of rays is made to incline toward the optical axis of the photographing lens.

The same effect is also obtained by utilizing an eccentricity of the condenser lens 62. In other words, as shown in FIG. 6(d), the condenser lens 62 is deviated toward the condenser lens 61. In addition, if a prism 81 with strong refraction power is employed, as shown in FIG. 6(e), the aperture 12 can take in the bundle of ray from an area on the exit pupil E close to the optical axis of the photographing lens, i.e., the distance between the light receiving portions 41 and 42 of the AF sensors can be shortened. It is understood that both effects, shown in FIG. 5(c) and that of FIG. 6(c), are attained at the same time.

The eccentricity of the condenser lens 62 and the prism 80 in FIG. 6(a) through FIG. 6(e) also function as the deflecting mechanism.

FIG. 5(a) through FIG. 5(d) and FIG. 6(a) through FIG. 6(e) mainly deal with the reimage forming optical systems "B" and/or "C" which correspond to the apertures 12 and 13 formed in the sagittal direction of the photographing lens. On the other hand, FIG. 7(a) and FIG. 7(b) show that the same space saving effect can be obtained even in the reimaging optical system "A", which corresponds to the aperture 11 formed in the radial direction of the photographing lens, with maintaining the bundle of ray taken in the aperture 12 being inclined toward the optical axis of the photographing lens.

In FIG. 7(a), the prism 81 with strong refraction power is disposed between the condenser lens 61 and the separater lens 30 and 31, so that the bundle of rays passed through the aperture 11 can be close to the bundle of rays passed through the aperture 12.

In FIG. 7(b), in addition to the arrangement of the prism 81 as described above, the prism 80 with weak refractive power may be disposed between the condenser lens 62 and the separater lenses 32 and 33, so that the distance between the light receiving portions 41 and 42 of the AF sensors 40a is closer than that of FIG. 7(a). The prism 80 and the prism 81 function as the deflecting mechanism.

Another embodiment is explained with reference to FIG. 8 and FIG. 9. It is noted that components, which are same as those of FIG. 1 and FIG. 2, have the same reference numerals. In these drawings, six apertures and corresponding reimaging optical systems are shown. Apertures 11 and 16 are arranged in the radial direction of the photographing lens, and disposed around the center of the field mask 10. Apertures 12 and 13, are arranged in the sagittal direction of the photographing lens, and disposed in the vicinity of the peripheral areas of the field mask 10. An intermediate aperture 14, is arranged in the sagittal direction of the photographing lens and disposed between the peripheral aperture 12 and the central aperture 11 and 16. An intermediate aperture 15 is formed in the sagittal direction of the photographing lens and disposed between the peripheral aperture 13 and the central apertures 11 and 16. The peripheral and the intermediate apertures 12, 13, and 14, 15, in particular, can receive a bundle of rays representing an image even when a height of the image becomes taller around the peripheral and intermediate areas of the field mask 10.

Each of the above apertures 11 through 16 corresponds to reimaging optical systems A' to C'. The reimaging optical system A' includes a mirror 20, an integral pair of condenser lenses 61 and 64, integral pairs of four separater lenses 30, 31, and 30', 31', and central light receiving portions 41 and 44 of the AF sensors 40a.

The reimaging optical system B', which actually covers the peripheral aperture 12 and the intermediate aperture 14, includes mirrors 21 and 22, a condenser lens 63 for the intermediate aperture 14, a condenser lens 66 for the peripheral aperture 12, integral pairs of four separater lenses 34, 35, and 34', 35', a light receiving portion 43 for the intermediate aperture 14, and a light receiving portion 46 for the peripheral aperture 12. The reimaging optical system C', which actually covers the peripheral aperture 13 and the intermediate aperture 15, includes mirrors 21 and 22, a condenser lens 62 for the intermediate aperture 15, a condenser lens 65 for the peripheral aperture 13, integral pairs of four separater lenses 32, 33, and 32', 33', a light receiving portion 42 for the intermediate aperture 15, and a light receiving portion 45 for the peripheral aperture 15. With the reimaging optical system A', for example, the bundle of rays passed through the central AF aperture 11 is incident on the condenser lens 61 corresponding to a normal height of an image. Then the bundle of rays from the condenser lens 61 is reflected 90 degrees (a right angle) by the mirror 20 toward the separater lenses 30 and 31 to split the image represented by the bundle of rays through the condenser lens 61. The split images are formed on the light receiving portion 41 on the reimaging plane 40. Similar to the central aperture 11, the condenser lens 64 receives a bundle of rays passed through the central aperture 16 when a height of an image is taller, and the bundle of ray through the condenser lens 64 is reflected 90 degrees (a right angle) by the mirror 20. The bundle of rays is directed toward to the separater lenses 30' and 31' to split the image represented by the bundle of rays through the condenser lens 64, and then the split images are formed on the light receiving portion 44 of the AF sensors 40a on the reimage forming plane 40.

When a height of an image becomes taller at the intermediate aperture 15 and the peripheral aperture 13, the condenser lenses 62, 65, the mirrors 21 and 22, the separater lenses 32, 33, 32', 33', and the light receiving portions 42 and 45 work as those of the reimaging optical system A' do.

When a height of an image becomes taller at the intermediate aperture 14 and the peripheral aperture 12, the condenser lenses 63, 66, the mirrors 21 and 22, the separater lenses 34, 35, 34', 35', and the light receiving portions 43 and 46 work as those of the reimaging optical system A' do.

In particular, the condenser lenses 62 and 63 can function as the deflecting means by providing eccentricity to the lens, as shown in FIG. 9, or attaching another prism (not shown), so that the bundle of rays passed through each of the condenser lenses 62 and 63 are closer respectively to the bundles of rays passed through each of the condenser lenses 65 and 66 corresponding to the peripheral apertures 12 and 13. For example, when the bundle of rays, which are passed through the condenser lenses 62 and 63 are reflected 90 degrees (a right angle) by the mirror 21 and reflected 90 degrees (a right angle) by the mirror 22, these bundles of rays are made closer to the bundles of rays passing through the condenser lenses 65 and 66, respectively because the bundles of rays passing through the condenser lenses 62 and 63 are already deflected due to the eccentricity of the condenser lenses 62 and 63, so that reimaging positions on the light receiving portions of the AF sensors are closer, as seen in FIG. 9 compared to FIG. 10. It should be noted that this effect implies that the light receiving portions of the AF sensors can accordingly be disposed closer each other.

Figure 10:
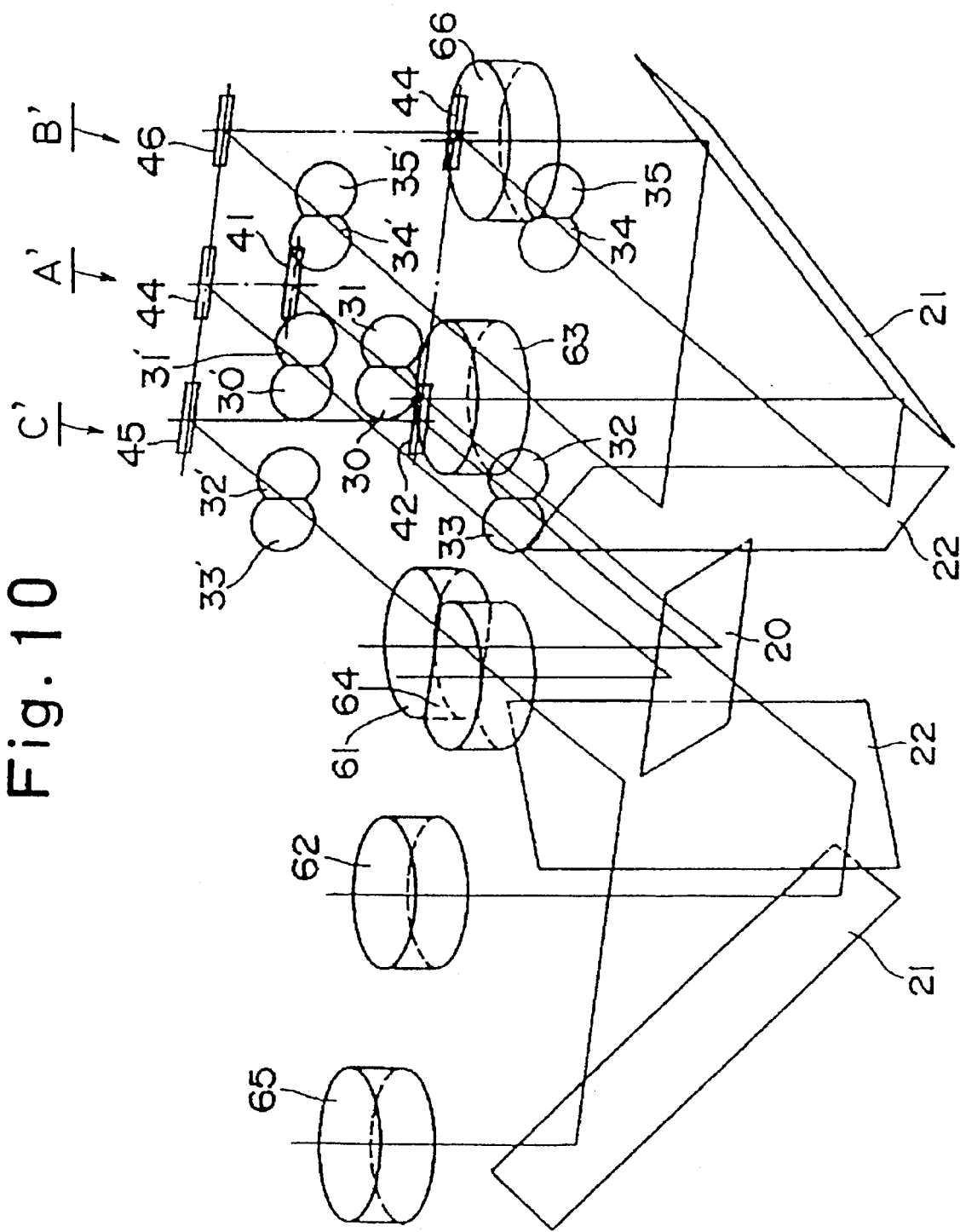
FIG. 10 is a perspective view of the focus detecting apparatus without the deflecting means.

For the purpose of verifying the effect of eccentricity of the condenser lenses 62 and 63, in FIG. 10, the condenser lenses 62 and 63 without eccentricity are indicated. It is clearly understood that in FIG. 10 the area of the mirrors 21 and 22 is larger than that of FIG. 9. Furthermore, the light receiving portions 42, 45, and 44, 46 of the AF sensors are distantly disposed, so that the size of the module in which the reimaging optical system is contained is inevitably large.

Though the deflecting mechanism is explained with reference to FIG. 9, the effect of the deflecting mechanism is indicated only by the eccentricity of the condenser lenses 62 and 63, each of which correspond to the intermediate apertures 14 and 15. Further examples of the deflecting mechanism are therefore indicated in FIG. 11(a) through FIG. 11(c) and FIG. 12(a) through FIG. 12(c) in a similar manner as FIG. 5(a) through FIG. 5(d), FIG. 6(a) through FIG. 6(e), and FIG. 7(a) and FIG. 7(b). The series of measures applied to the peripheral aperture 13 and the intermediate aperture 15 are also applicable to the peripheral and the intermediate apertures 12 and 14.

FIG. 11(a) shows an example where the condenser lens 63 does not have an eccentricity, i.e., no deflecting mechanism is provided. As explained, to take in a bundle of ray without vignetting, it is preferable for the intermediate and the peripheral apertures 15 and 13 to take in bundles of rays from an area of the exit pupil of the photographing lens as close as possible to the optical axis Ax of the photographing lens.

FIG. 11(b) shown an example of bundles of rays inclined toward the optical axis Ax of the photographing lens. This example, however, causes the light receiving portions 42 and 45 to be distant from the optical axis Ax, which inevitably makes the area occupied by the light receiving portions of the AF sensors larger.

FIG. 11(c) shows an example where prisms 80 are disposed behind each of the condenser lenses 62 and 65. It is clearly understood that the direction of the bundles of rays are inclined toward the optical axis Ax while the position of the light receiving portions 42 and 45 of the AF sensors is maintained as that of FIG. 11(a).

In addition to the above, FIG. 12(a) through FIG. 12(c) indicate examples in which a distance between the light receiving portions 42 and 45 of the AF sensors are shortened.

FIG. 12(a) shows an example that simply relocates the light receiving portion 42 towards the light receiving portion 45. This causes the bundle of ray taken in the intermediate aperture 15 to be too close to the optical axis Ax of the photographing lens.

FIG. 12(b) shows an example to compensate for the above drawback. The prism 80 is disposed behind condenser lens 62, so that the bundle of rays passed through the intermediate aperture 15 is adequately inclined with respect to the optical axis Ax of the photographing lens, and the bundles of rays passing through the peripheral and the intermediate apertures 13 and 15 are maintained as those of FIG. 11(b) and FIG. 11(c).

FIG. 12(c) further shows another example in which the prism 80 is disposed behind the condenser lens 65 to deflect the bundle of ray passed through the peripheral aperture 13 towards the bundle of ray passed through the intermediate aperture 15, so that the light receiving portion 45 is disposed closer to the light receiving portion 42.

As can be understood from the above discussion, the deflecting mechanism makes, one bundle of rays passing through at least one of the apertures to be close to anther bundle of ray passing through another aperture, so that the light receiving portions of the AF sensors can be disposed closely each other, and so that apertures formed in the sagittal direction of the photographing lens can take in a bundle of rays from an area of the exit pupil of the photographing lens close to the optical axis of the lens. Furthermore, according to the orientation changing mechanism, the apertures on the field mask can be formed in a different orientation configuration than that of the light receiving portions of the AF sensors.

I claim:

1. A focus detecting apparatus, comprising:
   a field mask disposed on a focal plane, said field mask being provided with multiple apertures arranged in a first orientation configuration, said multiple apertures allowing bundles of rays from a photographing lens to pass through;
   a plurality of condenser lenses disposed behind said apertures, each of said condenser lenses corresponding to each of said multiple apertures;
   plural pairs of separator lenses for splitting images seen through said multiple apertures;
   a sensor unit having multiple line sensors arranged in a second orientation configuration that differs from said first orientation configuration, said multiple line sensors being disposed on a reimaging plane for reimaging said split images, each of said line sensors corresponding to each of said multiple apertures;
   deflecting means for deflecting a bundle of rays passing through at least one of said multiple apertures to be close to another bundle of rays passing through another aperture while said first orientation configuration is maintained;
   changing means for changing orientation of said bundles of rays of said first orientation configuration passed through said multiple apertures into said second orientation configuration, said changing means disposed between said deflecting means and said separator lenses.

2. The focus detecting apparatus according to claim 1, at least one of said multiple apertures being arranged in a radial direction of said photographing lens and the remaining apertures of said multiple apertures being arranged in a sagittal direction of the photographing lens, said deflecting means deflecting a bundle of rays passing through at least one of said apertures arranged in said sagittal direction of the photographing lens to be close to a bundle of rays passing through said aperture arranged in said radial direction of the photographing lens.

3. The focus detecting apparatus according to claim 2, said deflecting means deflecting a bundle of rays passing through at least one of said apertures in said sagittal direction of the photographing lens to be close to a bundle of rays passing through said aperture arranged in said radial direction of the photographing lens.

4. The focus detecting apparatus according to claim 2, said deflecting means making each of said bundles of rays passing through said apertures arranged in said sagittal direction of the photographing lens incline toward an optical axis of the photographing lens.

5. The focus detecting apparatus according to claim 2, said deflecting means making one of said bundles of rays passing through at least one of said apertures arranged in said sagittal direction of the photographing lens, incline toward an optical axis of the photographing lens, while said deflecting means making one of said bundles of rays passing through at least one of said apertures arranged in said sagittal direction of the photographing lens incline toward a bundle of rays passing through said aperture arranged in said radial direction of the photographing lens.

6. The focus detecting apparatus according to claim 3, said orientation changing means comprising: two mirrors, each of said two mirrors reflecting bundle of rays passed through each of said apertures arranged in said sagittal direction of the photographing lens, by 90 degrees to said line sensors corresponding to said apertures arranged in said sagittal direction, so that said bundles of rays are incident on said line sensors; and
   one mirror which reflects said bundle of rays passed through said aperture arranged in said radial direction of the photographing lens 90 degrees to said line sensors corresponding to said apertures arranged in said radial direction so that said bundle of rays is incident on said line sensors.

7. The focus detecting apparatus according to claim 3, said deflecting means comprising an eccentricity provided on at least one surface of said condenser lens corresponding to said apertures arranged in said sagittal direction of the photographing lens, said eccentricity being provided by deviating said condenser lens from an axis extending between a center of said aperture and a center of a pair of said plural pairs of separator lenses.

8. The focus detecting apparatus according to claim 3, said deflecting means comprising a prism disposed behind a condenser lens of said plurality of condenser lenses.

9. The focus detecting apparatus according to claim 3, said deflecting means comprising a combination of a prism and an eccentricity of a condenser lens of said plurality of condenser lenses.

10. The focus detecting apparatus according to claim 1,
    said multiple apertures of said field mask on said focal plane comprising a plurality of central apertures arranged in said radial direction of the photographing lens, a plurality of peripheral apertures arranged in a sagittal direction of the photographing lens, and a plurality of intermediate apertures arranged in said sagittal direction of the photographing lens;

each of said plurality of intermediate apertures being disposed between said plurality of central apertures and adjacent ones of said plurality of peripheral apertures; and said deflecting means being disposed between said field mask and said orientation changing means so that a bundle of rays passing through at least one of said plurality of peripheral apertures is inclined towards a bundle of rays passing through one of said plurality of intermediate apertures.

11. The focus detecting apparatus according to claim 10, said deflecting means deflecting a bundle of rays passing through said at least one of intermediate apertures to be close to a bundle of rays passing through one of said peripheral apertures.

12. The focus detecting apparatus according to claim 10, said deflecting means making said bundles of rays passing through said peripheral apertures and said intermediate apertures incline towards an optical axis of the photographing lens.

13. The focus detecting apparatus according to claim 10, said deflecting means making said bundles of rays passing through said peripheral apertures and said intermediate apertures incline towards an optical axis of the photographing lens, while said deflecting means makes said bundles of rays passed through said peripheral apertures incline toward said bundles of rays passed through said intermediate apertures.

14. The focus detecting apparatus according to claim 11, said deflecting means comprising a prism disposed behind said condenser lens, on which a bundle of rays passed through said intermediate apertures is incident.

15. The focus detecting apparatus according to claim 11, said orientation changing means comprising:

one mirror, which reflects each of bundles of rays passed through a plurality of said central aperture arranged in said radial direction of the photographing lens 90 degrees to said line sensors so that said bundles of rays are incident on said line sensors corresponding to said plurality of central apertures; and two mirrors, each of which reflects each of said bundles of rays passed through said intermediate and peripheral apertures arranged in said sagital direction of the photographing lens 90 degrees to said line sensors corresponding to said intermediate and peripheral apertures so that said bundles of rays are incident on said line sensors.

16. The focus detecting apparatus according to claim 6, said multiple line sensors arranged in said second orientation configuration being a row of single CCD sensors.

17. The focus detecting apparatus according to claim 15, said multiple line sensors comprising two rows of single CCD sensors, one of said two rows of said single CCD sensors corresponding to one of said plurality of central apertures arranged in said radial direction of the photographing lens, and said plurality of peripheral apertures arranged in said sagittal direction of the photographing lens;

the other row of said two rows of said single CCD sensors corresponding to the other of said plurality of central apertures, and said plurality of intermediate apertures.

18. The focus detecting apparatus according to claim 1, wherein said first orientation configuration is H-shaped, and said second orientation configuration is line-shaped.

* * * * *

UNITED STATES PATENT AND TRADEMARK OFFICE
CERTIFICATE OF CORRECTION

PATENT NO. : 5,530,236
DATED : June 25, 1996
INVENTOR(S) : T. SENSUI

It is certified that error appears in the above-indentified patent and that said Letters Patent is hereby corrected as shown below:

At column 14, line 4 (claim 15, line 4), change "aperture" to ---apertures---.

At column 14, line 12, (claim 15, line 11), change "sagital" to ---sagittal---.

Signed and Sealed this

Fourth Day of March, 1997

*Attest:*

BRUCE LEHMAN

*Attesting Officer*    Commissioner of Patents and Trademarks